United States Patent
Stern

(10) Patent No.: US 7,197,713 B2
(45) Date of Patent: Mar. 27, 2007

(54) SYSTEM AND METHOD FOR CONTROLLING NETWORKED DEVICES AND ACCESSING, MANIPULATING AND VIEWING INTERNET AND NON-INTERNET RELATED INFORMATION THROUGH MULTIPLE SESSIONS

(76) Inventor: Joseph L. Stern, 15 W. 12th St., Apt. 2-E, New York, NY (US) 10011

( * ) Notice: Subject to any disclaimer, the term of this patent is extended or adjusted under 35 U.S.C. 154(b) by 0 days.

(21) Appl. No.: 10/274,977

(22) Filed: Oct. 22, 2002

(65) Prior Publication Data

US 2003/0052916 A1    Mar. 20, 2003

Related U.S. Application Data

(63) Continuation of application No. 09/287,260, filed on Apr. 7, 1999, now Pat. No. 6,486,892.

(51) Int. Cl.
*G06F 3/00* (2006.01)

(52) U.S. Cl. .................. 715/745; 715/719; 715/725; 715/738; 715/760; 725/39; 725/59

(58) Field of Classification Search ........ 345/719–726, 345/733, 738; 725/39, 59; 715/760, 745
See application file for complete search history.

(56) References Cited

U.S. PATENT DOCUMENTS

| | | | |
|---|---|---|---|
| 4,468,732 A | 8/1984 | Raver | |
| 4,694,490 A | 9/1987 | Harvey et al. | |
| 4,704,725 A | 11/1987 | Harvey et al. | |
| 4,827,447 A * | 5/1989 | Croes et al. ............... | 715/530 |
| 4,956,774 A | 9/1990 | Shibamiya et al. | |
| 4,965,825 A | 10/1990 | Harvey et al. | |
| 5,109,414 A | 4/1992 | Harvey et al. | |
| 5,233,654 A | 8/1993 | Harvey et al. | |
| 5,335,277 A | 8/1994 | Harvey et al. | |
| 5,347,632 A | 9/1994 | Filepp et al. | |
| 5,404,510 A | 4/1995 | Smith et al. | |
| 5,412,808 A | 5/1995 | Bauer | |
| 5,526,034 A | 6/1996 | Hoarty et al. | |
| 5,530,852 A | 6/1996 | Meske, Jr. et al. | |

(Continued)

OTHER PUBLICATIONS

Pfaffenberger, Netscape Navigator: Surfing the Web and Exploring the Internet, 1995, Academic Press, Inc., pp. 88-90, 168-169, 110-111, 286.*

(Continued)

*Primary Examiner*—Sy Luu
*Assistant Examiner*—Ryan Pitaro
(74) *Attorney, Agent, or Firm*—Hunton & Williams, LLP

(57) ABSTRACT

A system and method are disclosed for accessing, generating, presenting and manipulating Internet and non-Internet related information, data and content, including information netcast over the Internet. The system is also capable of controlling operatively connected, privately networked devices. A number of graphical user interfaces are utilized to facilitate user access, manipulation and control of information, data and content and networked devices. Some of the graphical user interfaces are time and topic oriented, are customizable by the user, and allow for the manipulation of information, data, content and operatively connected networked devices from the graphical interfaces themselves. The system is preferably enhanced through the use of an intelligent, dynamically updated user profile that is fully integrated with the system.

16 Claims, 8 Drawing Sheets

U.S. PATENT DOCUMENTS

| | | | |
|---|---|---|---|
| 5,579,055 A | 11/1996 | Hamilton et al. | |
| 5,587,734 A | 12/1996 | Lauder et al. | |
| 5,592,660 A | 1/1997 | Yokota et al. | |
| 5,594,507 A | 1/1997 | Hoarty | |
| 5,596,373 A | 1/1997 | White et al. | |
| 5,598,536 A * | 1/1997 | Slaughter et al. | 709/219 |
| 5,600,378 A | 2/1997 | Wasilewski | |
| 5,630,119 A | 5/1997 | Aristides et al. | |
| 5,652,613 A * | 7/1997 | Lazarus et al. | 725/50 |
| 5,666,645 A | 9/1997 | Thomas et al. | |
| 5,694,176 A | 12/1997 | Bruette et al. | |
| 5,696,897 A * | 12/1997 | Dong | 714/15 |
| 5,701,451 A * | 12/1997 | Rogers et al. | 707/1 |
| 5,710,884 A * | 1/1998 | Dedrick | 709/217 |
| 5,712,129 A | 1/1998 | Ford | |
| 5,712,979 A | 1/1998 | Graber et al. | |
| 5,717,860 A | 2/1998 | Graber et al. | |
| 5,727,129 A | 3/1998 | Barrett et al. | |
| 5,737,599 A | 4/1998 | Rowe et al. | |
| 5,754,938 A | 5/1998 | Herz et al. | |
| 5,754,939 A | 5/1998 | Herz et al. | |
| 5,758,257 A | 5/1998 | Herz et al. | |
| 5,761,662 A | 6/1998 | Dasan | |
| 5,774,664 A | 6/1998 | Hidary et al. | |
| 5,784,058 A | 7/1998 | LaStrange et al. | |
| 5,784,608 A | 7/1998 | Meske, Jr. et al. | |
| 5,793,438 A | 8/1998 | Bedard | |
| 5,801,747 A | 9/1998 | Bedard | |
| 5,801,753 A | 9/1998 | Eyer et al. | |
| 5,812,123 A | 9/1998 | Rowe et al. | |
| 5,813,007 A | 9/1998 | Nielsen | |
| 5,819,301 A | 10/1998 | Rowe et al. | |
| 5,854,897 A | 12/1998 | Radziewicz et al. | |
| 5,867,495 A | 2/1999 | Elliott et al. | |
| 5,887,243 A | 3/1999 | Harvey et al. | |
| 5,893,091 A | 4/1999 | Hunt | |
| 5,948,040 A | 9/1999 | Delorme et al. | |
| 6,476,827 B1 * | 11/2002 | Porter | 715/738 |
| 6,486,892 B1 * | 11/2002 | Stern | 715/760 |

OTHER PUBLICATIONS

Ed Bott, Ron Person. Special Edition Using Windows 95 with Internet Explorer. Pub Date: Feb. 17, 1998. ISBN: 0789715538.*
T. Selkes, "Coach: A teaching agent that learns", Communications of the Association for Computer Machinery, 37(7): 92-99 Jul. 1994.
Wittig et al., "Intelligent Media Agents in Interactive Television Systems", Proceedings of the International Conference on Multimedia Computing and Systems, Washington, May 15-18, 1995, Los Alamitos, IEEE Comp. Soc. Press., US, p. 182-189.

* cited by examiner

| E-MAIL: JOE | E-MAIL: JANE | WEB GUIDE / NETCAST SCHEDULE | TV GUIDE | RADIO GUIDE | | |
|---|---|---|---|---|---|---|
| LAST INTERNET SESSION: JOE (FEB. 27, 1999) | LAST INTERNET SESSION: JANE (MAR. 30, 1999) | INTERNET BROWSER | | COMMUNICATIONS CONTROL 32 | | |
| JOE'S THESIS | MICROSOFT WORD (TM) 22 | PERSONAL INFORMATION MANAGER | | HOME / OFFICE CONTROL PANEL 33 | CLIMATE CONTROL 34 | |
| MEMO BOARD | | INVESTMENTS AND FINANCES | | EMERGENCY 35 | | |
| | | | | | | |

FIG. 3

| WEBCAST SCHEDULE [DATE] | | | | | | | | | | |
|---|---|---|---|---|---|---|---|---|---|---|
| 6:00 | 6:30 | 7:00 | 7:30 | 8:00 | 8:30 | 9:00 | 9:30 | 10:00 | 10:30 | 11:00 |
| VICTORIA SECRET FASHIONS ~31 | | | | | | | | | | |
| | | A/V DAILY NEWS | | | A/V DAILY NEWS SPORTS | | | | | |
| INTEL ANALYST CONFERENCE | | | CNN STOCK NEWS | CBS MARKET-WATCH INTERVIEW | | | | | | |
| | | | | WEBCAST MTV VIDEOS : BEST OF THE 1980'S | | | | | | |
| DUKE NUKEM INTERACTIVE | | MORTAL KOMBAT INTERACTIVE | | ROAD RACER INTERACTIVE | | | | | | |

FIG. 5

SYSTEM AND METHOD FOR CONTROLLING NETWORKED DEVICES AND ACCESSING, MANIPULATING AND VIEWING INTERNET AND NON-INTERNET RELATED INFORMATION THROUGH MULTIPLE SESSIONS

This application is a continuation of U.S. patent application Ser. No. 09/287,260 filed Apr. 7, 1999 now U.S. Pat. No. 6,486,892, the contents of which are incorporated herein in their entirety.

BACKGROUND OF THE INVENTION

1. Field of the Invention

The present invention relates to an interactive software program for providing access to data on or off the Internet, and more particularly, to a software program which allows users to access, generate, present and manipulate an active presentation of sites, sources and services related to the Internet and Internet related technologies and to control privately networked devices. This access, manipulation and displaying is facilitated by use of a variety of graphical interfaces, one of which is a time and topic oriented program guide which displays and organizes Internet and non-Internet related broadcasts, information, data and content.

2. Background

The use of the Internet and the World Wide Web (the "Web") is continuing to expand at an exponential rate. Indeed, content is continuously added to and otherwise made available to users, new users are logging on every day to search and view this information, and new systems are being developed and linked to the Internet to take advantage of this information and content. As a result, the already vast and diverse types of information residing on the Web grow larger every day.

Today, accessing this vast storehouse of information is accomplished through the use of Web browsers which provide user-friendly graphical user interfaces by which everyday users may access and manipulate information on the Web. A browser functions on a point-to-point basis by contacting a web site and obtaining information from the site in the form of web page. This information is retrieved through the use of one or more search engines which attempt to identify, obtain and organize what is likely to be the most relevant information requested by the user on a specific the topic, based on the user's specific inquiry and search parameters.

Retrieved web pages often contain hypertext or hypermedia links by which users can access related textual and audio, video, graphic animation and other active content, respectively. The presentation of graphical and audio active content on the Web is very recent development. Other recent developments include the proliferation of "push" and "netcasting" technology. Push technology allows users who subscribe to a push service to receive periodic updates of predetermined, user-designated information of interest to the user. The service software makes automatic, periodic queries to sites containing information relevant to the user's requests, to see if there exists new, pertinent information on the subscribed to topics. If so, the service "pulls" the new information from the remote site and "pushes" it onto the user's computer or other display.

"Netcasting" or "webcasting," on the other hand, is an alternative to traditional Web browsing. Unlike browsing, where users go out on the Web and search for information, netcasting information may be broadcast over the Internet by a single host such that the data can be received by multiple recipients over one or more "multicast channels." A user wishing to receive a netcast simply tunes into the proper digital channel. Thus, a user's computer acts like a television or radio receiver. This technology not only has the potential to turn the Internet into a mass-distribution channel for digital information on the same scale as broadcast television, but also to facilitate the interaction between the Internet and various types of private network systems and devices.

One major disadvantage of the current browser system is high network traffic over the Internet resulting from the combination of numerous and repeated site-to-site user information requests and the downloading of requested information. Other disadvantages are that all too often, the information retrieved is not responsive to the user's request and not organized in a user-friendly format. Yet another disadvantage arises from the inability of current browsers to permit users to access, present and manipulate traditional web-based information and the more recent push and netcast information, either separately or in combination. In other words, the current browser system for accessing the Internet is ill-equipped to identify, access, manipulate and display traditional Web-based information and the distribution of Internet and non-Internet programming over digital Internet channels. Further, the current browser system is equally ill-equipped to control privately networked devices. Thus, various drawbacks exist with the current approaches and other known techniques and methods.

SUMMARY OF THE INVENTION

An object of the invention is to overcome these and other drawbacks of prior approaches.

Another object of the invention is to provide one or more graphical user interfaces ("GUI") by which users can identify, access, manipulate and view Internet related information, events and services, where such graphical interfaces may be tailored according to a user's preferences.

Another object of the invention is to automatically, or upon a user's specific request, access and store hyperlink and hypermedia information without displaying the related links, Web pages or content.

Another object of the invention is to display information retrieved from the Web in various user-friendly formats as a comprehensive, organized whole.

It is a further object of the invention to create continuously updated user profiles based on a user's Web and non-Web related activities.

It is a further object of the invention is to identify, access, retrieve and store information and events taking place on the Web based on a user's profile, either automatically or in response to a user's specific command.

Yet another object of the invention is to provide for the updates of Web sites based on a user's continuously updated profile, and to alert the user when such updates occur and to provide summary information regarding the updates.

Yet another object of the invention is to allow users to continue an Internet or off-line session where the user left last off.

Yet another object of the invention is to scan the Internet for netcasted programming and other information and events and to display such information and events in a user-friendly, time oriented GUI.

It is yet another object of the invention to allow for the downloading of past, present or future Web and non-Web related information, content and events by means of a user-friendly GUI, either automatically or in response to a user's specific command.

Another object of the invention is to provide for the access, retrieval and storage of summary or detailed information on the Web for selected objects by merely "highlighting" the objects.

Another object of the invention is to provide a system and method by which Web and non-Web related information, content and events are integrated with television, cable radio and other broadcast programming, information or data.

Yet another object of the invention is to provide a system and method by which Web and non-Web related information, content and data may be accessed and manipulated by one or more networked devices utilizing the same system and method, where those devices can be used to control other networked devices.

These and other objects of the invention are carried out, alone or in various combinations, according to various embodiments of the invention detailed herein.

According to one embodiment of the invention, a standardized yet modifiable GUI is presented in the form of a grid which illustrates and provides instant and easy access to numerous applications and functions. The grid may be based on graphical icons text, sound or any combination thereof. According to one preferred embodiment the standardized GUI grid is touch sensitive and voice activated and responsive.

According to one embodiment, application which is activated by the grid is a GUI presented in the form of a Web Program Guide ("WPG"). The WPG displays Web netcasts, non-Web related broadcasts and other events and information (collectively "net programming") in a grid-like schedule displayed according to, among other things, net and broadcast channels, and the time of broadcast. The GUI allows a user to move forward or backward in time to display prior, current and future net programming. A user can also obtain information related to the programming, such as summaries of a selected program's topic or content. In another preferred embodiment, the system allows for the one-step downloading and storage of a net program by simply highlighting the net program in the WPG. Alternatively, a user can schedule future downloads by time, net program, general topic, or user profile.

Program guides similar in nature to the WPG are available for television and cable broadcasts and radio broadcasts, individually. Alternatively, these information and content guides can be combined and viewed as an organized and comprehensive guide displaying all broadcasts, information, data and content available on any individual guide. Where appropriate the individual and comprehensive guides in a time and topic oriented format.

Another feature of the present invention is the ability of the system to create user-specific profiles for multiple users based on their Web and non-Web related activities. The profiles are continuously updated and evaluated. The system may use a user's profile to notify the user of forthcoming Web and non-Web events, broadcasts or other information deemed by the system to be pertinent to the user's interests. Using this profile, for example, the system can update the WPG with net programming of which the user is unaware but which is likely to be of interest to the user. Preferably, the system downloads such programming for subsequent off-line viewing.

Still another feature of the present invention is the use of a user's profile to identify and notify a user when Web sites of interest have been modified in a way related to the interests specified by the profile. In one preferred embodiment, the system provides summary information of the modification so that the user can readily evaluate whether the change is of import.

According to another embodiment of the present invention the system identifies and downloads related hypertext and hypermedia links found in the Web page being viewed by the user, including Web pages linked to the first and higher tier pages. Preferably, this downloading takes place in the "background" and is transparent to the user. Alternatively, the system might automatically download all links within a domain only. Or, the user can specify the number of related links which the system will identify and download. Further, the system automatically terminates an Internet connection after downloaded is complete. In addition, according to yet another embodiment, the downloaded information is displayed as a comprehensive whole in a manner prescribed by the user, such as pages in a book, file card format or any other manner.

Yet, another feature of the invention allows the user to continue an Internet or off-line session at the Web page, document or content the user last viewed prior to terminating the previous session. This may be accomplished regardless of whether the Web page, document or content is stored on the system or whether the system must connect to the Internet to display the information.

According to one preferred embodiment, the grid and guide driven system is integrated and networked with devices such as home or office appliances and products such that Internet access and communications can be initiated and maintained from and through these devices and such that the devices can be controlled from various locations.

Other features and advantages of the present invention will be apparent to those skilled in the art from a reading of the Detailed Description of the Preferred Embodiments presented below.

BRIEF DESCRIPTION OF THE DRAWINGS

FIG. 3 depicts one graphical user interface (GUI) according to the present invention.

FIG. 5 depicts a GUI according to one embodiment of the present invention which illustrates a Web-based program guide.

DETAILED DESCRIPTION OF PREFERRED EMBODIMENTS

Figure 1:
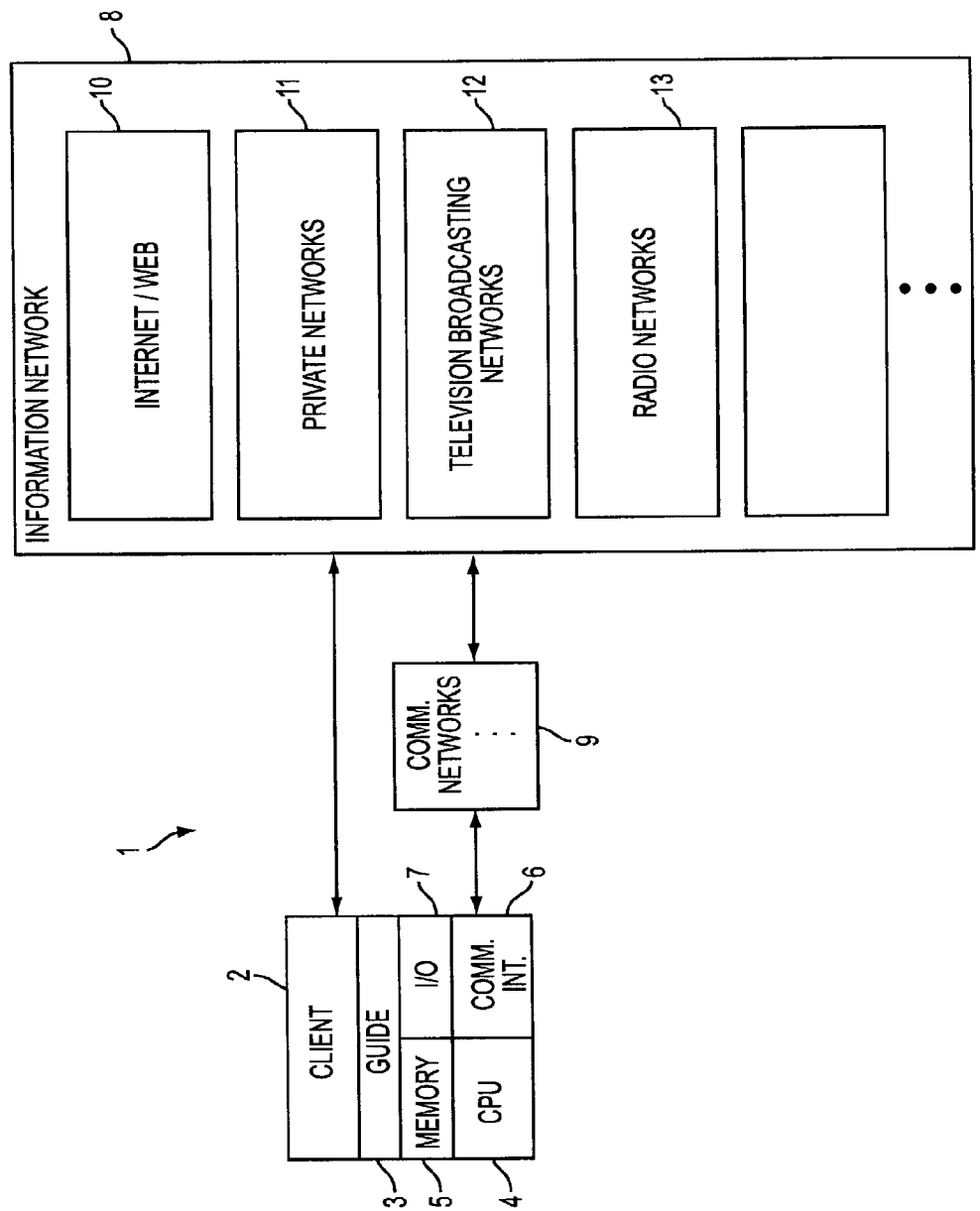
FIG. 1 is a general depiction of a computer network system in which the present invention may operate.

The present invention is a comprehensive, integrated software tool which provides a user with the means for managing information and data regardless of type, source or subject. Many of the elements of the system of the present invention are shown in FIG. 1. Referring to FIG. 1, system 1 is shown to consist of a client 2 on which the guide software application (Guide) 3 resides, having a central processing unit (CPU) 4, local memory 5, communications interface 6, and input/output interface 7. The implementation of the present invention is primarily applicable in a client-server architecture, although in certain aspects of the invention there is no server which interacts with the client. Client 2 may be any device with a CPU and other components capable of running the Guide such as, but not limited to, a computer or television set-top box. For example, client 2 may be a personal communications device such as a digital phone or even a refrigerator. For purposes of this discussion, however, unless noted otherwise, it will be assumed that the client is a personal computer which may or may not be connected to a private network such as an intranet or extranet. The local memory includes any storage medium such as, but not limited to, a computer hard drive, random access memory (RAM), compact disc read only memory (CD-ROM), digital video disc (DVD), magnetic disk, cache or similar storage media. The input/output interface includes any device or interface capable of providing interaction with the client such as, but not limited to, a keyboard, keypad, mouse or even a voice recognition interface.

Figure 2:
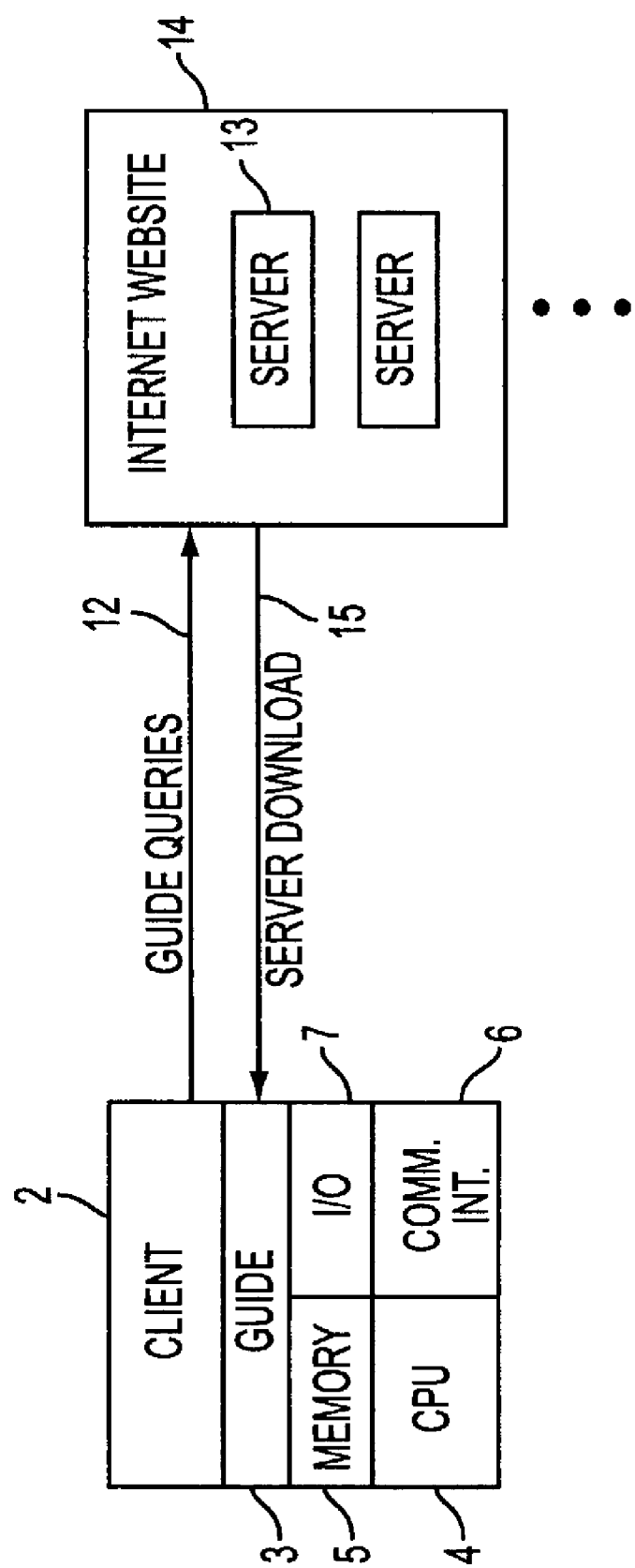
FIG. 2 depicts a specific example of a client-server architecture by which the present invention may operate.

As shown in FIG. 1, client 2 may be connected to information network 8 directly or through communications network 9. Communications network 9 encompasses any communication network capable of interacting with and providing at least one-way communications where appropriate with any subset of information network 8, including but not limited to the Internet 10, any private computer network 11, any broadcasting network 12 whether it be television, cable or satellite based or radio broadcasting network 13. Client 2 in FIG. 1 also contains communications interface 6 which provides for communications internal to the client between the Guide software application 3, CPU 4, memory 5 and other components internal or operatively connected to client 2. A more specific illustration of the interaction between client 2 and one or more of the subsets of the information network 8 is shown in FIG. 2. Such interaction is generally accomplished by way of Guide queries 12 for data sent by the client 2 through communication network 9 to a remote server 13 resident on a remote network, in the example of FIG. 2, a server for an Internet Web Site 14. Information, data or other content is received by client 2 by way of one or more Web server downloads 15.

FIG. 3 depicts a grid graphical user interface (GUI) 16 of the Guide according to one embodiment of the invention. GUI 16 and the Guide in general may be activated and displayed instantly or relatively so on a display for client 2 as soon as the client has been turned on in those cases where the client is originally off. Further, according to one embodiment, any and all startup applications which may be resident on the client may be loaded and initialized in the background while GUI 16 and the Guide in general are shown.

Figure 4:
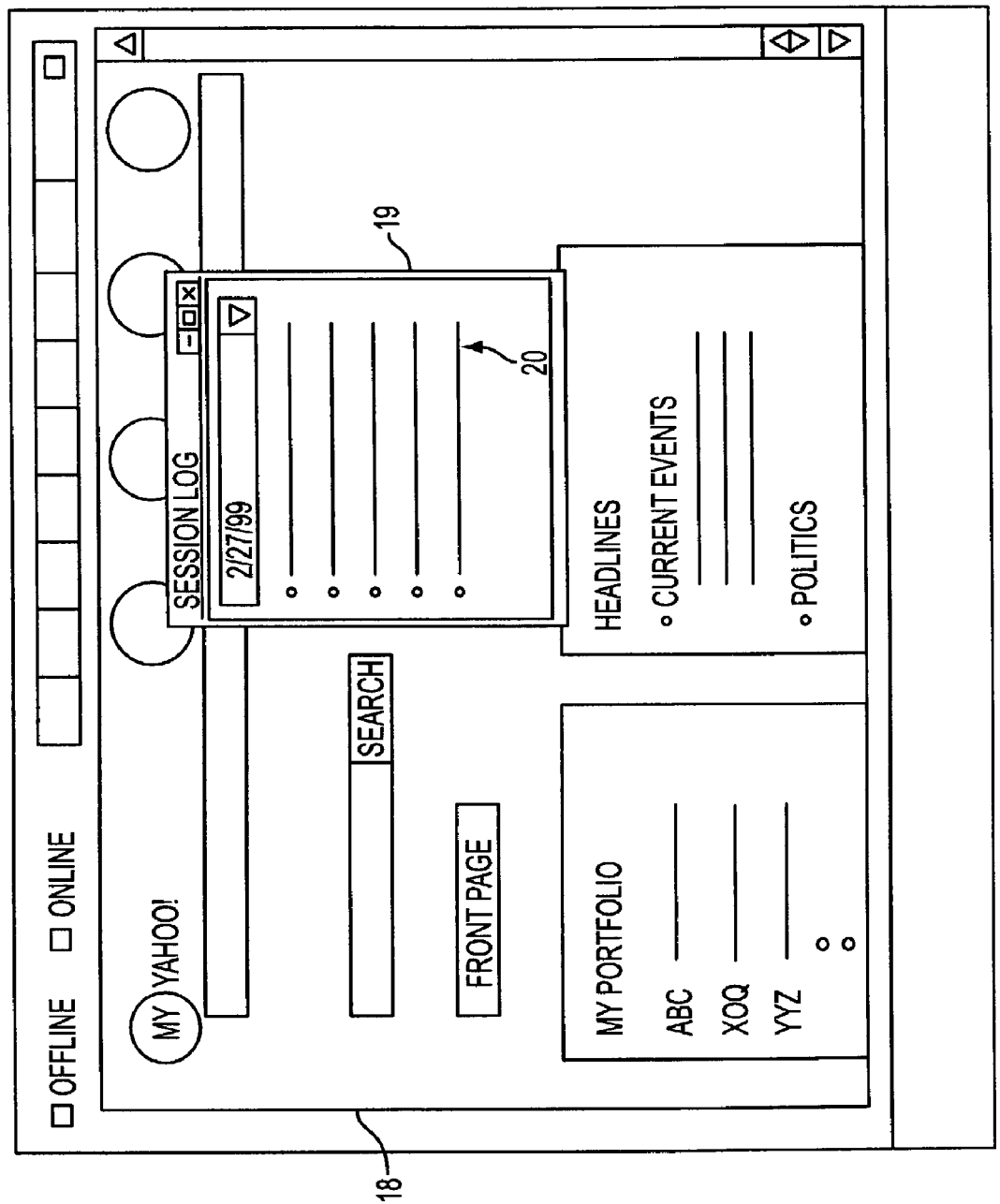
FIG. 4 illustrates a Web page and a window containing a session log according to one embodiment of the present invention.

Referring to FIG. 3, a GUI grid 16 is shown according to one preferred embodiment with graphical icons representing various subjects, groupings and labels of information. Preferably, it is by GUI 16 that the system organizes the information, and applications contained in the Guide. Icon 17 of grid 16, labeled "Last Internet Session: Joe," for example, indicates the date of the last Guide session during which a user interacted with Internet network 10. As shown in FIG. 4, selecting icon 17, by any of the input methods discussed above, causes the Guide to display, for example, the last Web page 18 on a particular Web site that was displayed prior to the end of the previous session. Preferably, icon 17 will be modified by the Guide to indicate the type of content a user accessed at the end of the previous session. For example, if the user was last viewing a document off-line prior to signing off on the previous session, the icon would be modified to indicate this in some fashion.

Also displayed in FIG. 4 is a window 19 listing the Web pages or files 20 that were used during the previous session. Selecting any one of these listings causes that Web page or file content to be displayed. Preferably, grid 16 also contains icons for Guide based objects such as "e-mail" 21, software applications resident on the client but external to the Guide, such as Microsoft Word (™) 22 or any other application or content. Selecting any of these icons activates the specific application or content. A user may modify grid 16 to either display multiple icons for a specific subject where each icon corresponds to a distinct user, or instead an entire grid may created to correspond to a distinct user.

According to one preferred embodiment, whenever the Guide is connected to the Internet and accessing a Web page, the Guide automatically, or upon a user's specific request, accesses, downloads and stores Web pages or any other content linked to the current Web page, whether through a textual or graphical hypertext or hypermedia link. This access, downloading and storing process includes all identification and uniform resource locator (URL) information for the related links. The access, download and storing process is preferably accomplished in the background although some type of indicator may show that the process is ongoing or completed.

The number of linked Web pages and sites which may be accessed, downloaded and stored by the Guide may be determined in a variety of ways. According to one preferred method, the Guide is capable of accessing, downloading and storing all linked Web pages or other content within a specific Web domain only. After such a download and store are complete, the Guide goes off-line automatically, thereby decreasing Internet traffic and facilitating viewing of the downloaded material. For example, if a user desiring to read today's news accesses the home page for the Washington Post online newspaper, the Guide, according to the embodiment described above will access, download and store on the user's client all related hypertext and hypermedia links and corresponding content which reside on one or more servers within the Web domain for the Washington Post. In this way, the Guide downloads and stores one day's entire online newspaper without also downloading unrelated content from another domain.

For example, the home page of the online Washington Post may have on it a graphical link to an advertiser's Web domain, such as a link for Mastercard (™) or Charles Schwab (™). The Guide's intelligent downloading process, however, will only access, download and store links to or from the Washington Post's home page that are found and reside within the newspaper's domain, regardless on whether the content is located on one or more servers within that domain. Thus, when the Guide automatically goes off-line, the user can view and read the content of that day's Washington Post without unrelated, extraneous content. This downloaded content may them be displayed, viewed and manipulated in any number of ways. For example, the content of the newspaper can be displayed and viewed with pages being displayed side by side in ascending order divided by sections, mimicking real-life, hard copy newspapers, viewed as cascading pages or in any other format, such as through the use of drop-down menus, one or more windows, graphical or textual overlays, and video or audio output, either separately or in some combination thereof.

As an alternative to accessing, downloading and storing all linked Web pages or other content within a specific Web domain only, the Guide can access, download and store linked Web pages or other content where the links and content reside on one or more servers in one or more Web domains. Additionally, the user may also specify the number of tiers or successive links which the Guide will access, download and store, set a general default tier number for such actions or designate accessing, downloading and storage parameters differently for different Web sites. According to another embodiment of the invention, the accessing, downloading and storage process is implemented using a user's profile. Further, the Guide allows a user to access a Web site from one client and download and store accessed information and content to another client or remote site.

All of the above processes described above will typically occur whenever a user makes a new contact with an Internet Web site. Any and all Internet interaction is logged and stored by the Guide. Using such an internal log, the Guide can recognize when a user is revisiting a Web site previously accessed, downloaded and stored. Preferably, in such cases, the Guide will scan the Web site and download and store new or revised information, data or content only before going off-line. This new information, data or content may or may not overwrite preexisting information, data or content.

Figure 6:
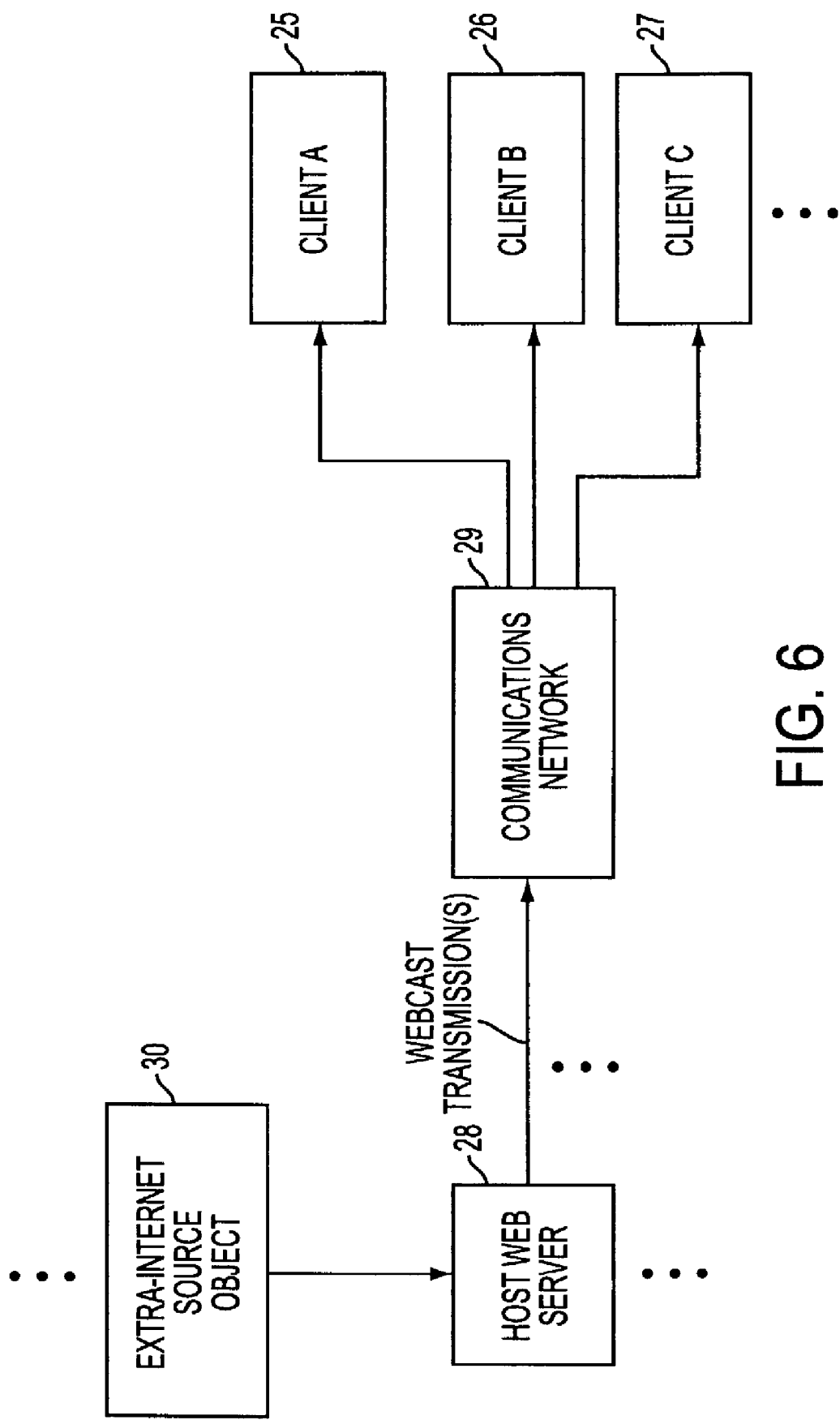
FIG. 6 illustrates a computer and communications network system implementing a webcast transmission.
Figure 7:
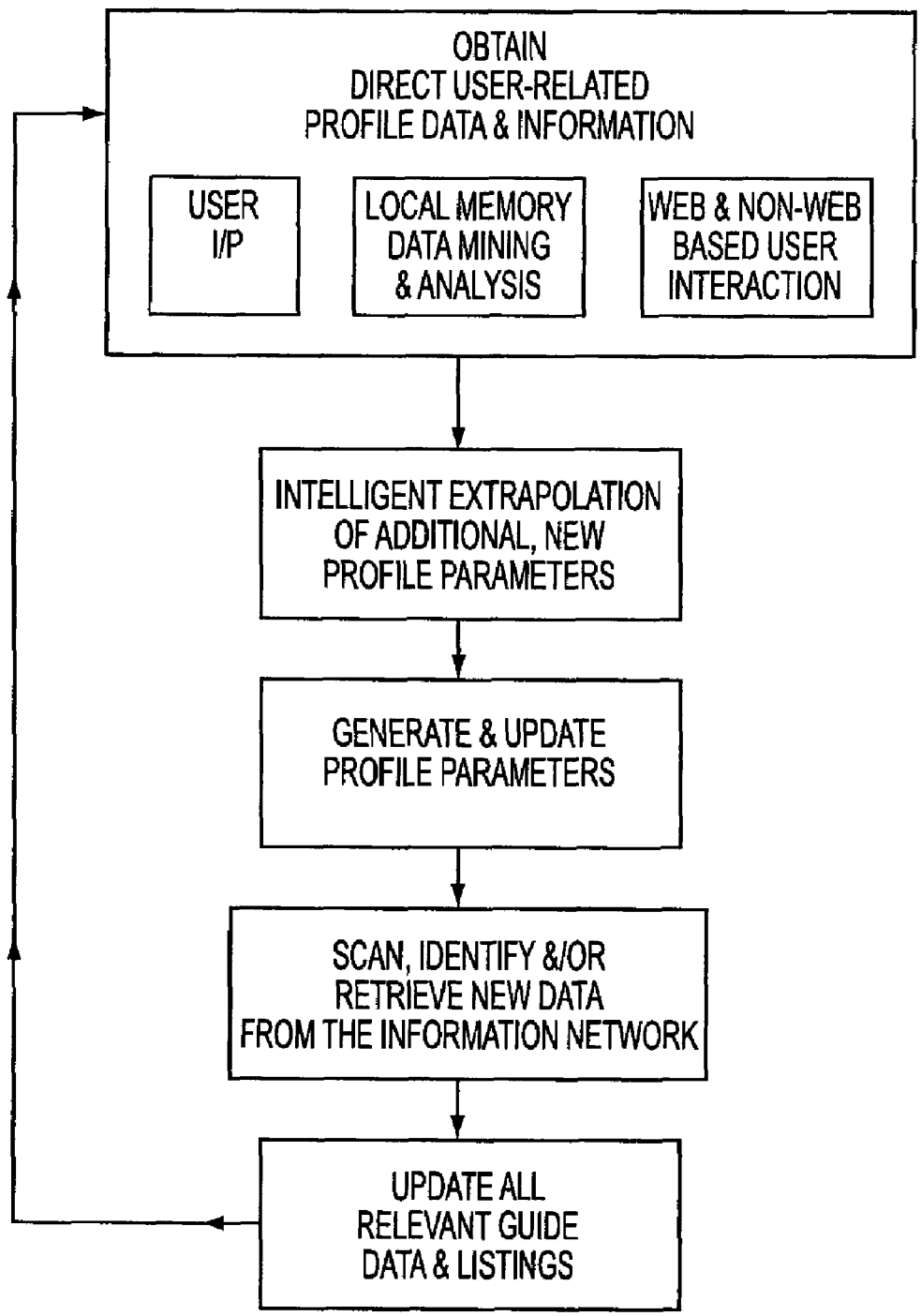
FIG. 7 is a flow chart illustrating the steps by which an intelligent user profile according to the present invention is generated and implemented.

Referring to FIG. 3, selection of icon 23 of grid 16, labeled "netcasting schedule" or some similar name, brings the user to a GUI 24 shown FIG. 5 which displays a Web Programming Guide ("WPG"), a schedule of netcasted programming broadcast over the Internet. FIG. 5 illustrates one possible layout for the WPG of the present invention. Information, data or programming "netcast" or "webcast" over the Internet is information, data, programming or any content that is broadcast over the Internet generally from one or more host Web servers to one or more clients. Such information may be either audio, video, data or any combination thereof. Further, the information, data or programming may originate from the Internet or from outside the Internet. FIG. 6 illustrates this communication model wherein multiple user clients 25, 26 and 27 receive webcast input from host Web site server 28 through communications interface 29. Thus, webcast information and data may be received without the need for venturing onto the Web in search of information. Instead, a client of the webcast based system acts like a television receiver. This information or data is preferably updated dynamically. Such information and data can include news, weather, sports, financial and other commercial or personal information content provided via audio or video streaming or some other means. The webcasting of such content or data can provide, for example, live news broadcasts, automatic software updates or updated stock quote information. Such content may originate from a source external to the Internet. Such as external source object 30 in FIG. 6. According to a preferred embodiment of the present invention, however, webcasted information and data is received and organized automatically and continuously, without the need to subscribe to a host Web server or Web subscription service, and not in response to an initial Guide query as shown in FIG. 2. This is far superior to current applications that make use of webcast information and data where users must first subscribe to one or more host Web server services which either directly netcast or otherwise transmit such information and data over the Internet or aggregate such information for netcast.

Referring again to FIG. 3, selection of icon 32 of grid 16, labeled "communications control" will according to one preferred embodiment activate a Web or non-Web linked telephone device. Preferably a display of a standard phone-like representation will appear upon activation including but not limited to standard numbers, speed dial buttons, messaging and other control features. Using this display a user can dial and make outgoing calls. Incoming calls can also be received and will preferably be accompanied by a caller-id overlay. According to one preferred embodiment, a user may video conference with one or more parties should he so desire, assuming that the other parties have communications systems with video capabilities. Preferably, the system will store all outgoing and incoming calls along with caller-id and other information. The communications control capabilities of the present invention are preferably integrated with icon 35 of grid 16 labeled "emergency." Activation of this icon by any means automatically triggers and activates the communications control subsystem of the present invention to send outgoing calls to user specified entities such as the police, fire department, hospital or relatives.

According to another embodiment of the invention, the client 2 is connected to and integrated with a private network 11 where the private network one with components consisting of various devices, appliances and products found in a typical home or office. According to this embodiment, devices and products such as telephones, refrigerators, exercise equipment and furniture are each equipped with a client 2 capable of running and displaying the present invention. In this way, a user can use any and all of the functions of the present invention described herein from any such device, appliance or product. Preferably, these devices, appliances and products are themselves networked such that they can be controlled from any client and point to point communications using the present invention is possible in a household, for example, without requiring an Internet connection. Control of such devices, appliances and products is accomplished according to one embodiment by selection of icon 33 or grid 16 labeled "home/office control panel." Preferably, selecting icon 33 causes the display of a GUI with visual representations of a user's home, for example. Using input/output interface 7, a user can select the devices, appliances and products that the user seeks to control remotely. In this way, for example, a user can select the lighting in a room and increase or decrease the light levels as he chooses from another location. According to one embodiment, specific devices which a user frequently manipulates or adjusts can be given there own icon on grid 16. Icon 34 of grid 16, labeled "climate control," is one such example. In this way, the simply selection of icon 34 allows a user to directly access and manipulate the climate control's of a person's home or office directly, without the need to first access a comprehensive control layout. Further, using input/output interface 7, a user cam remotely access the system of the present invention and control devices, appliances and products from another client.

According to one preferred embodiment of the present invention, the functionality of the Guide is enhanced by the creation, integration and use of an intelligent, dynamic user-profile. According to this embodiment, the user-profile creation and updating process is completely automated and does not require, for example, initial user-specific input of profile parameters. The intelligent user profile, which resides on the user's client, is generated and otherwise derived from an amalgamation of static and non-static data and sources. For example, the system monitors and tracks the user's Internet and Web related interactions with foreign databases and information sources, compiles relevant data from such interactions and updates the user's intelligent profile accordingly. Although not required, the user may directly input profile parameters directly into the system thereby modifying or updating the profile.

The intelligent profiling system and method also obtains information and data used to enhance and otherwise add information to a user's profile by interacting with any local data storage, depending upon where the Guide application resides or is running. If, for example, the Guide is resident and being run on a stand alone computer, the system will automatically scan the computer's local memory, such as the computer's hard drive, to determine what programs and applications are contained in memory. The system will then automatically extract information from the programs and applications, store the information and update the user's profile accordingly. For example, a user may use Intuit Corporation's Quicken (™) money management software to track his savings, investments, bills and other similar information. The Guide will scan, extract and compile data and other information contained in the application and update the system's user's profile accordingly. Using the Quicken™ application example, the system may determine that the user has made a number of purchases related to gardening as described in the ledger of the user's checking account or credit card purchases. The system will extract such information and update the user's intelligent profile accordingly. In this way, the user's profile will contain parameters related to gardening, even though the user neither input such parameters directly nor interacted with a Web or non-Web based data source germane to that topic. In a similar manner, the system might extract all of the stocks listed in the user's investment portfolio as tracked on Quicken (™). As a further example, the user may have purchased an off-the-shelf software application used for generating and tracking one's family history in order to compile a family tree. The Guide will note the presence of this application and update the user's system profile to include one or more parameters directed to and otherwise reflecting the user's interest in genealogy. Then, when for example, the user is connected to the Internet, the system may scan the Web and identify and/or retrieve data and information on home gardening or Web sites devoted to genealogy. Similarly, the Guide might independently identify, select or record a webcast or television broadcast on this topic. The Guide is fully integrated such that all pertinent aspects of the Guide are updated according to newly identified and obtained information. Thus, for example, a newly identified profile parameter for gardening might result in the identification and retrieval of a webcast on the topic of gardening which will in turn be incorporated into the Guide's WPG, or the identification and retrieval of a television cable broadcasts on the topic of gardening which will in turn be incorporated into the Guide's EPG.

According to another aspect of the invention, a user's profile may be updated and otherwise enhanced as a result of intelligent extrapolation. In this embodiment, the system analyzes profile parameters obtained from past or prior Web interactions, user input and local storage data mining and extrapolates new parameters based on an intelligent analysis of one or more preexisting parameters. In this way, the Guide acts in an intuitive manner to identify or retrieve information or data on topics which the system concludes the user is likely to be interested in, even though the user himself may not know that such topics or information exists. The system analyzes the user's use of these extrapolated topics and information and uses such interaction, or lack thereof, as feedback. In this way, the system can learn the user's preferences and better fine tune its profiling function.

This intelligent profile can interact with Web based and non-Web based applications to facilitate a user's desired goal or enhance the profiling aspects of a foreign Web site. For example, a user may visit the on-line merchant Amazon.com's ™ Web site for the first time to order a specific book. After the user's first purchase, Amazon's Web site system makes purchase recommendations for other books which the user might enjoy. These recommendations are based on the book purchases of others who purchased the same book the user bought and demographical comparisons. Such comparison recommendations are inaccurate because they are based on other individual's actions and seeming preferences and not that of the purchaser. Preferably, however, the Guide's intelligent profile will interact with Amazon's database and scan the database for the names of books and corresponding abstracts to allow the Amazon Web site to recommend books that more accurately reflect the user's preferences. Notably, the information comprising the Guide's intelligent profile resides on the client at all times such that none of the profile information can be captured or otherwise stored or downloaded by a foreign Web site. In this way, the user's profile parameters remain confidential and secure.

The Guide is capable of creating, updating and maintaining multiple, distinct user profiles, such as for different members of a user's household, in addition to a comprehensive user Guide profile derived from the combination of these multiple, sub-profiles.

Referring to FIG. 5, the Guide allows a user to download and store a scheduled webcast or other broadcast transmission by direct use of the WPG. Using input/output interface 7, a user can simply select a grid cell in WPG 24 corresponding to the webcast, broadcast or other transmission the user desires to record and store. According to one embodiment of the invention, for example, a transmission such as webcast Victoria Secret Fashion Show 31 is selected by pointing to the grid cell corresponding to that netcast transmission and, for example, clicking on the cell using a mouse. As shown by the shading in FIG. 5, the grid cell would preferably change its color to indicate that the transmission is scheduled for downloading and storage. Any number of transmissions may be recorded using this one-step selection method. According to another embodiment of the invention, using for example, the right click of a mouse a user could pull up a window by which the user could more specifically designate desired actions regarding a WPG transmission. Such a window, may include commands to download the transmission once, or in the case of a periodic transmission such as a weekly broadcast, command the Guide to automatically download the transmission each week, no matter what time or digital channel the transmission is broadcast on. As a further example, the window could contain a command allowing for the e-mailing or transmission of a downloaded program to another user.

Figure 8:
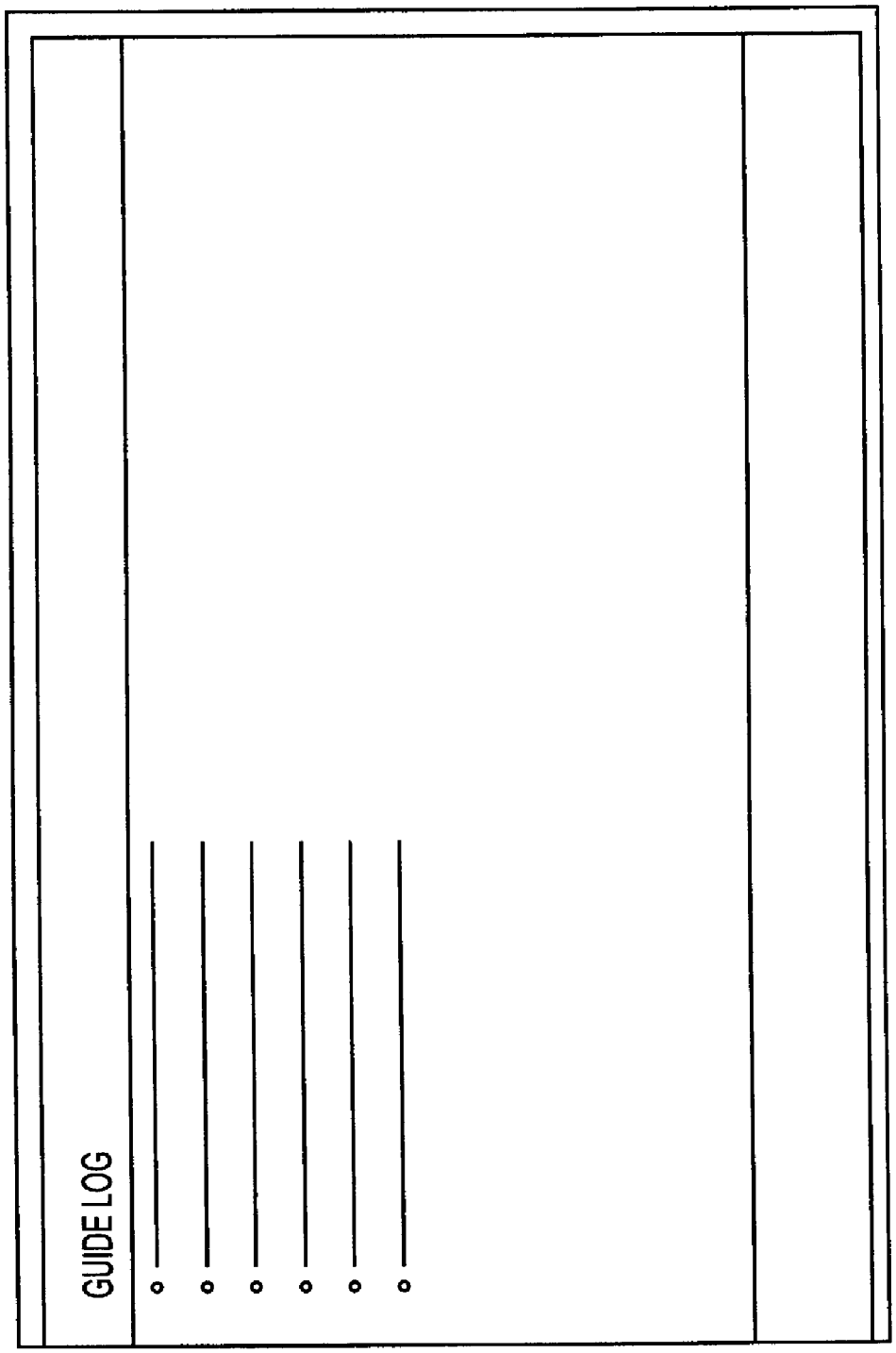
FIG. 8 depicts a window of the system containing a log of all Web sites and other content stored in the system.

Yet another aspect of the Guide is its ability to update any and all information contained in the Guide based on a user's intelligent profile. FIG. 8 shows a window listing titles of current Web sites, pages and related documents stored in the Guide from all sessions. The Guide automatically and periodically scans the Web sites from which these pages, documents and content originated and determines whether there have been any modification to the pages, documents or content. According to one embodiment of the present invention, this determination is made based on a user's intelligent profile. Thus, only if the change corresponds to one or more profile parameters will the page, document, information or data be updated. In the case of a Web page, for example, the Guide will automatically download the newly revised page for the user's online or off-line viewing, but it will not overwrite the existing page. In one embodiment of the invention, the Guide will highlight the new or revised material in some manner, such as by a highlighting color, underlining, bolding or some similar manner. This method is much more efficient than other updating methods which update information only if a user first joins a Web site updating subscription service, which update information resulting from any change or revision to a Web page however insignificant, such as the correction of a typographical error, or methods which update information only in response to an alert from the manager of a Web site.

Other embodiments, features and uses of the invention will be apparent to those skilled in the art from a consideration of the specification, accompanying drawings and practice of the invention disclosed herein. Accordingly, the specification and examples set forth above should be considered exemplary only. The scope of the invention is limited only by the claims appended hereto.

What is claimed is:

1. A method for enabling access of information obtained from Internet and non-Internet information sources, comprising:
    providing a graphical user interface comprising a plurality of icons of selection options for selecting operations during a first browsing session, the operations including accessing on-line content from the Internet and accessing off-line content;
    using the graphical user interface during the first session to perform a plurality of operations comprising accessing the on-line content from the Internet or accessing the off-line content, the plurality of operations including a final operation;
    terminating the first session after the final operation;
    initiating a second session using the graphical user interface; and
    providing a modified graphical user interface for the second session, the modified graphical user interface including new icons for resuming the last operations of different users, the new icons including an icon that resumes the final operation of an immediately prior session, other of the icons for resuming the last operations of different users.

2. The method of claim 1, wherein a user engages multiple selection operations during the first session corresponding to multiple operations such that the user was viewing multiple content corresponding to the multiple operations when the user signed off from the first session, and further wherein the step of providing a modified graphical user interface for the second session comprises providing multiple new icons for resuming access to the multiple content corresponding to the multiple operations.

3. The method of claim 1, wherein the final operation comprises accessing on-line content from the Internet, and the new icon provides access to the on-line content that was being viewed just prior to terminating the first session.

4. The method of claim 3, wherein the new icon provides access to the on-line content by retrieving Web content that was stored in a user computer system.

5. The method of claim 3, wherein the new icon provides access to the on-line content by connecting to the Internet in order to retrieve the Web content.

6. The method of claim 1, wherein the final operation comprises accessing off-line content comprising a document, and the new icon provides access to the document that was being viewed just prior to terminating the first session.

7. The method of claim 1, further comprising the step of labeling the new icon according to type of content accessed during the final operation.

8. The method of claim 1, wherein the new icon indicates the user who was accessing the content during the final operation.

9. A graphical user interface generated by a client application running on a computer, comprising:
    a plurality of selection options for selecting operations during a first browsing session of the client application using the graphical user interface, including a selection option for accessing on-line content from the Internet and a selection option for accessing an off-line content from an off-line application; and
    a resume operation options for resuming access during a second session of the client application to content that was active when a user terminated the first session, wherein the graphical user interface indicates that the resume options resume a prior sessions of a different user.

10. The graphical user interface of claim 9, wherein the content that was active was content from an on-line Internet session, and wherein a resume operation option provides access to the content from the on-line Internet session.

11. The graphical user interface of claim 10, wherein a resume operation option provides access to the content from the on-line Internet session by retrieving locally stored Web content.

12. The graphical user interface of claim 10, wherein a resume operation option provides access to the content from the on-line Internet session by connecting to the Internet.

13. The graphical user interface of claim 9, wherein the content that was last active was a document from an off-line application, and wherein a resume operation option provides access to the document.

14. The graphical user interface of claim 9, wherein the content that was active when the user terminated the first session comprises on-line content from the Internet and off-line content from an off-line application, and wherein a resume operation option enables access to the on-line content from the Internet and the off-line content from the off-line application during the second session.

15. The graphical user interface of claim 9, wherein a resume operation option is labeled according to type of content that was last active when a user terminated a first session.

16. The method of claim 9, wherein resume operation option indicates the user who was accessing the content that was last active when a user terminated a first session.

* * * * *